(12) United States Patent
Minamiyama

(10) Patent No.: US 11,876,943 B2
(45) Date of Patent: Jan. 16, 2024

(54) NON-TRANSITORY COMPUTER-READABLE STORAGE MEDIUM, SERVER, SERVICE SYSTEM, AND SERVICE PROVIDING METHOD

(71) Applicant: BROTHER KOGYO KABUSHIKI KAISHA, Nagoya (JP)

(72) Inventor: Yukinori Minamiyama, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/699,213

(22) Filed: Mar. 21, 2022

(65) Prior Publication Data

US 2022/0321728 A1    Oct. 6, 2022

(30) Foreign Application Priority Data

Mar. 31, 2021  (JP) .................. 2021-060262

(51) Int. Cl.
*H04N 1/34* (2006.01)
*G06F 3/12* (2006.01)

(52) U.S. Cl.
CPC .......... *H04N 1/344* (2013.01); *G06F 3/1204* (2013.01); *G06F 3/1231* (2013.01); *H04N 1/346* (2013.01)

(58) Field of Classification Search
None
See application file for complete search history.

(56) References Cited

U.S. PATENT DOCUMENTS 10,555,202 B1* 2/2020 Narayanan ............ H04W 24/10
2013/0155451 A1  6/2013 Nakahara
2016/0277370 A1* 9/2016 Lee ...................... H04W 12/50

FOREIGN PATENT DOCUMENTS

JP  2007-156531 A  6/2007
JP  2013-125520 A  6/2013
JP  2017-49924 A  3/2017

* cited by examiner

*Primary Examiner* — Frantz Bataille
(74) *Attorney, Agent, or Firm* — KENEALY VAIDYA LLP

(57) ABSTRACT

A server includes a controller The controller acquires device-usage information, which indicates a status of use of a subscribed device which is a device subscribing to a service, from the subscribed device, generates service-usage information indicating a status of use of the service, based on the acquired usage information, acquires an exchange request for changing the subscribed device from a first device currently subscribing to the service to a second device different from the first device, and changes the subscribed device from the first device to the second device, in response to the acquired exchange request.

20 Claims, 10 Drawing Sheets

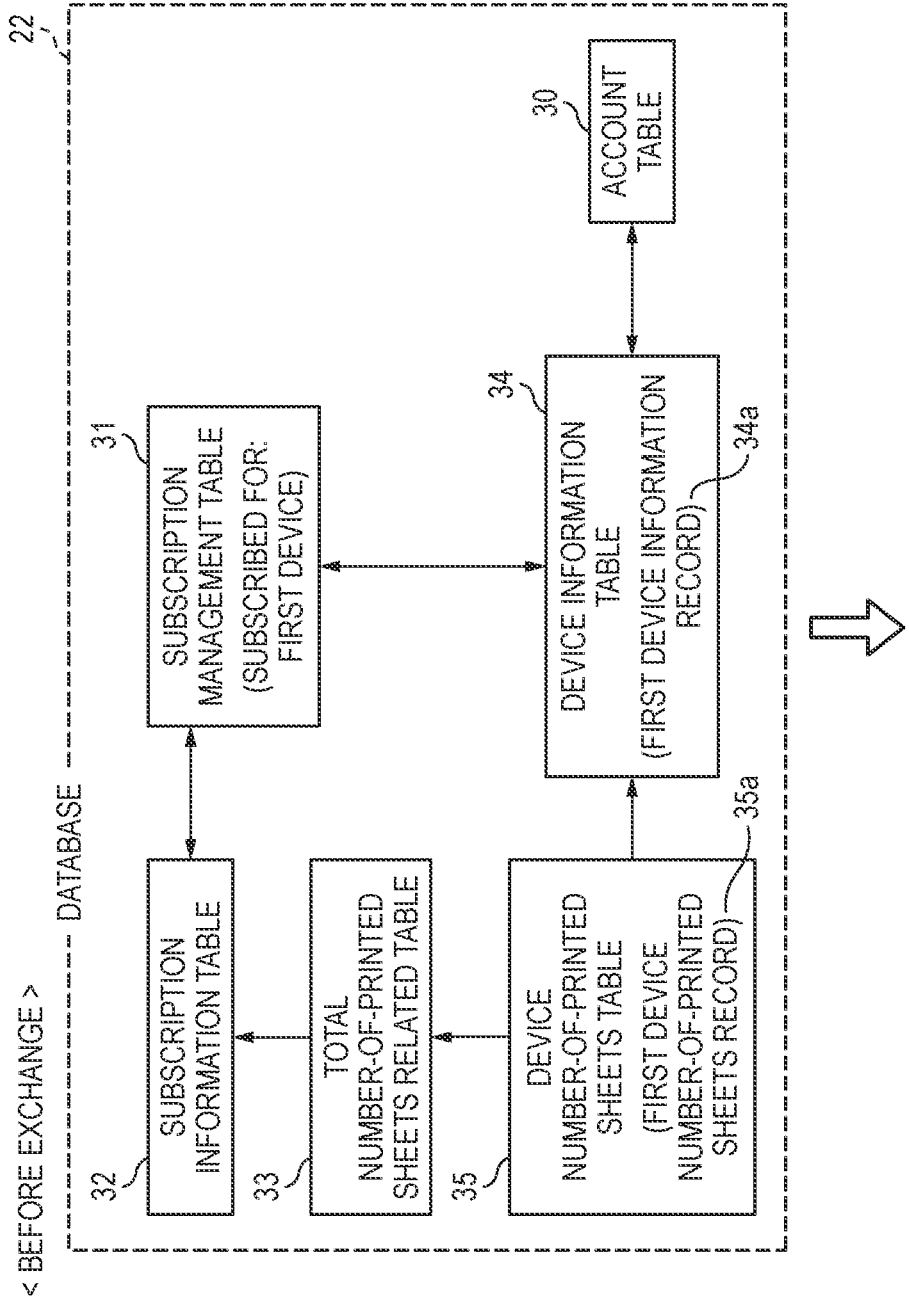

NON-TRANSITORY COMPUTER-READABLE STORAGE MEDIUM, SERVER, SERVICE SYSTEM, AND SERVICE PROVIDING METHOD

CROSS-REFERENCE TO RELATED APPLICATION

This application is based upon and claims the benefit of priority from prior Japanese patent application No. 2021-060262 filed on Mar. 31, 2021, the entire contents of which are incorporated herein by reference.

TECHNICAL FIELD

The present disclosure relates to a technology of providing a service intended for a device such as a printer.

BACKGROUND

JP-A-2007-156531 discloses a server configured to provide a variety of services intended for a device. The server is configured to provide a flat-rate service for consumable maintenance. The flat-rate service for consumable maintenance provides consumables (for example, toner and sheets), which are used in a device registered for the service, at a flat rate during a maintenance period.

It may occur that it is necessary to replace a device subjected to subscribe to a service with another new device. In this case, it is desired to effectively exchange the device subjected to subscribe to the service.

SUMMARY

An object of the present disclosure is to provide a technology whereby it is possible to effectively exchange a device subjected to subscribe to a service.

A first aspect of the present disclosure is a non-transitory computer-readable storage medium storing computer-readable instructions. The computer-readable instructions are executed by a computer of a server.

The computer-readable instructions cause the server to perform acquiring device-usage information of a subscribed device from the subscribed device. The subscribed device is the device subscribing to a service. The device-usage information indicates a status of use of the subscribed device.

The computer-readable instructions cause the server to perform generating service-usage information indicating a status of use of the service, based on the acquired usage information.

The computer-readable instructions cause the server to perform acquiring an exchange request. The exchange request requests to change the subscribed device from a first device currently subscribing to the service to a second device different from the first device.

The computer-readable instructions cause the server to perform changing the subscribed device from the first device to the second device, in response to the acquired exchange request.

A second aspect of the present disclosure is a server including a controller configured to perform:
  acquiring device-usage information, which indicates a status of use of the subscribed device that is a device subscribing to a service, from the subscribed device;
  generating service-usage information indicating a status of use of the service, based on the acquired usage information;
  acquiring an exchange request for changing the subscribed device from a first device currently subscribing to the service to a second device different from the first device; and
  changing the subscribed device from the first device to the second device, in response to the acquired exchange request.

A third aspect of the present disclosure is a service system including a server, a first device, a second device, and an information processing apparatus,
  in which the server includes a controller configured to perform:
    acquiring device-usage information, which indicates a status of use of a subscribed device that is a device subscribing to a service, from the subscribed device;
    generating service-usage information indicating a status of use of the service, based on the acquired usage information;
    second acquisition processing of acquiring, from the information processing apparatus, an exchange request for changing the subscribed device from the first device currently subscribing to the service to the second device different from the first device; and
    changing the subscribed device from the first device to the second device, in response to the acquired exchange request, and
  the information processing apparatus is configured to perform:
    receiving an instruction operation of instructing to change the subscribed device from the first device to the second device; and
    transmitting the exchange request to the server, in response to the received instruction operation.

A fourth aspect of the present disclosure is a service providing method including:
  acquiring device-usage information, which indicates a status of use of a subscribed device that is a device subscribing to a service, from the subscribed device;
  generating service-usage information indicating a status of use of the service, based on the acquired usage information;
  acquiring an exchange request for changing the subscribed device from a first device currently subscribing to the service to a second device different from the first device; and
  changing the subscribed device from the first device to the second device, in response to the acquired exchange request.

In the server of the above aspects, while the subscribed device is the first device, usage information of the first device is acquired. When the subscribed device is changed to the second device, the usage information to be acquired is changed to the second device. On the other hand, the service utilization information is not generated individually for each device but generated in a service unit under contract. That is, the service utilization information is not generated for each device every time a device subjected to subscribing to a service is changed. The service utilization information is generated based on the usage information of the second device changed from the first device. For this reason, before change, the service utilization information is updated, in response to the usage information of the first device being acquired, and after change, the service utilization information is further updated according to the usage information of the second device being acquired. This suppresses an increase in resource (i.e., an increase in information to be generated and managed) associated with the change in the device subjected to subscribing, and enables to effectively change the device subjected to subscribing.

BRIEF DESCRIPTION OF DRAWINGS

FIGS. 4A and 4B illustrate a change in database associated with a change of a subscribed device.

DETAILED DESCRIPTION

An example of the present disclosure will be described with reference to the drawings.

1. Example (1-1) Outline of Device Service System

Figure 1:
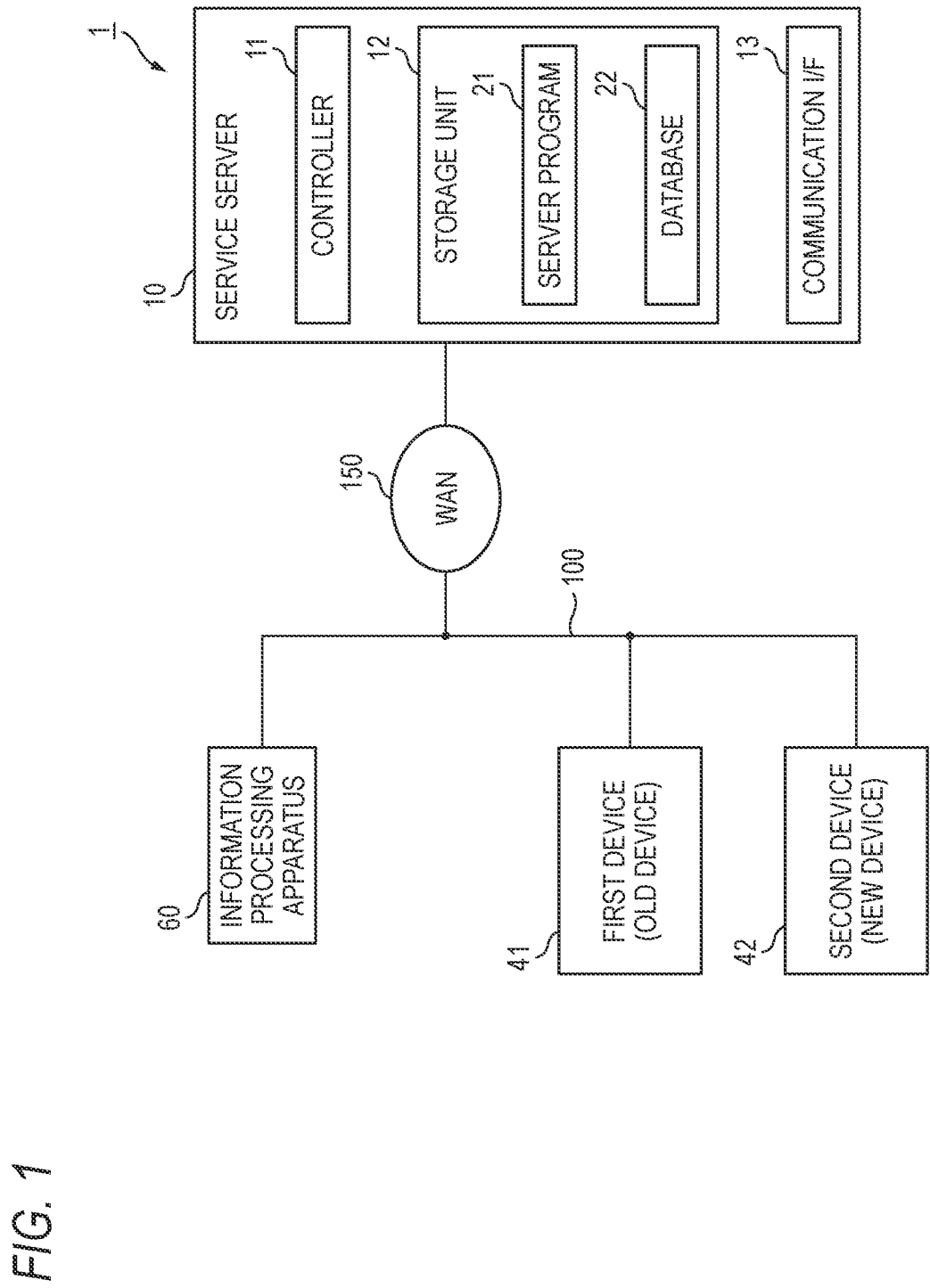
FIG. 1 illustrates an outline of a device service system of an example.

A device service system 1 of the present example shown in FIG. 1 includes a service server 10, a first device 41, a second device 42, and an information processing apparatus 60. The device service system 1 is configured to provide a device management service. More specifically, in the device service system 1, the service server 10 is configured to provide a device management service for a device (hereinafter, referred to as 'subscribed device') subscribing to the device management service. The subscription (registration) for the device management service is individually performed for each device.

In the present example, a device that can subscribe to the device management service is a device having a printing function, such as a printer and a complex machine. The printing function is a function of acquiring data of an image to be printed and printing an image indicated by the data on a sheet-like to-be-recorded medium. Both the first device 41 and the second device 42 have the printing function. Therefore, both the first device 41 and the second device 42 can subscribe to the device management service.

Note that, in the present example, it is assumed that the first device 41 has been already subscribed to the device management service and the second device 42 has not subscribed to the device management service, as an example. In the below, a device management service, which is currently concluded (registered) for the first device 41, is referred to as a first subscription. Note that, other one or more devices are present in addition to the first and second devices 41 and 42, so that a second subscription, a third subscription and the like may also be concluded individually for the other one or more devices. In the present example, it is assumed that a device subjected to be under the first subscription is exchanged from the current first device 41 to the second device 42.

The service server 10 is configured to be able to communicate with each of the first device 41, the second device 42 and the information processing apparatus 60. In the present example, the first device 41, the second device 42 and the information processing apparatus 60 are connected to a communication network 100. The communication network 100 is connected to a WAN (Wide Area Network) 150. The service server 10 is connected to the WAN 150.

Therefore, in the present example, the service server 10 is configured to be able to communicate with each of the first device 41, the second device 42 and the information processing apparatus 60 via the WAN 150 and the communication network 100.

Note that, the service server 10 may also be connected to the communication network 100. The information processing apparatus 60 may be connected to the WAN 150, and may be connected to the communication network 100 via the WAN 150. The information processing apparatus 60 may also be configured to be able to communicate with the service server 10 without passing through the WAN 150. In a situation where the first device 41 subscribes to the device management service, the second device 42 may not be connected to the communication network 100.

The communication network 100 may include a wired network or may include a wireless network. The WAN 150 may be any network. In the present example, the WAN 150 is, for example, the Internet configured to perform communication according to TCP/IP protocols.

(1-2) Outline of Device Management Service

Specific contents of the device management service that is provided by the service server 10, and a flow of a procedure and processing at the time of subscription to the device management service are schematically described.

The device management service of the present example is, for example, a service intended for, particularly, consumables of the subscribed device, and includes a so-called subscription service (flat-rate service). "subscription" includes not only a subscription to a flat-rate service but also a subscription to a service other than the flat-rate service as far as a description indicating the flat-rate service is not cited such as "subscription service". The service other than the flat-rate service includes a service of an automatic ordering of a consumable on a pay-per-consumption basis, and a print service. As well as the above noun "subscription", the verb "subscribe" includes not only "subscribing to the flat-rate service" but also "subscribing to a service other than the flat-rate service".

That is, in the present example, when a subscription to a service is concluded, a service-dedicated cartridge is provided, as a cartridge where a coloring material (toner or ink) to be used for printing is accommodated. A subscribing user mounts the dedicated cartridge to the subscribed device and uses the subscribed device. The dedicated cartridge can be used only during the subscription, and can be no longer used when the service is canceled.

A monthly fee is set as compensation for the service to the subscribing user. Specifically, for each subscription, printing can be performed up to a prescribed number of sheets (for example, M sheets per one month). When a number of printed sheets within one month exceeds the prescribed number of sheets, an additional fee is charged. For example, a certain fee is additionally charged each time the prescribed number of sheets is exceeded by N sheets. In a case where the number of actually printed sheets for one month is smaller than the prescribed number of sheets, a surplus may be carried over to a next month.

The service server 10 is configured to periodically collect and accumulate various data from the subscribed device. Specifically, when a subscription intended for a certain device is concluded, the service server 10 instructs the subscribed device to periodically notify notice-subjected information. The instruction includes a type and a notice interval of the notice-subjected information to be noticed. Examples of the notice-subjected information may include the number of printed sheets, a remaining amount of a consumable, a version of firmware, a variety of status information, and the like. The subscribed device receiving the instruction is configured to periodically transmit the specified notice-subjected information to the service server 10 at the specified notice interval.

In addition, the service server 10 can issue an action instruction for the subscribed device. Examples of the action instruction may include an instruction to change a variety of setting values that are used in the subscribed device, a printing execution instruction, and the like. When the subscribed device receives the action instruction from the service server 10, the subscribed device performs processing according to the instruction.

As described above, the remaining amount of the consumable (here, a remaining amount of the coloring material of the dedicated cartridge) is periodically monitored by the service server 10. When the remaining amount falls below a certain level, a new dedicated cartridge is automatically ordered and delivered to the subscriber.

A procedure of causing a desired device to subscribe to the device management service is outlined as follows. A user first accesses a Web page, which is provided by a server program 21 (which will be described later) in the service server 10, by using a terminal program 62*b* (which will be described later) in the information processing apparatus 60 (i.e., in the present example, by using a Web browser). Specifically, the user accesses a login page, for example. Then, the user generates (registers) an account on the service server 10, starting from the login page. By registering the account, the user is ready to be able to subscribe to the device management service.

The user who has registered the account registers a device that the user wants to receive a service on the service server 10. At this point of time, the device is in a state of being registered on the service server 10, as a device for which a subscription is possible, and has not reached a subscription. The registration of the device is also performed by accessing the Web page of the service server 10 by using the terminal program 62*b* of the information processing apparatus 60.

The user who has registered the device performs a subscription procedure intended for the registered device. Specifically, the user accesses a Web page for a subscription on the service server 10, and inputs necessary information. The necessary information may include, for example, a subscription plan (for example, a monthly fee), an address to which a consumable will be delivered, information necessary for payment (for example, credit card information), and the like.

Note that, for a subscription to the device management service, the device subjected to subscribe should meet subscription-allowed conditions. The subscription-allowed conditions may be arbitrarily determined. The subscription-allowed conditions may be determined based on a specification of a device, for example. The subscription-allowed conditions may be different for each subscription plan. When a device that does not meet the subscription-allowed conditions is intended for subscription, the service server 10 issues an error notice, as described later.

When the subscription procedure is completed, a subscription intended for the registered device is formally concluded. A subscriber can confirm a variety of information pertaining to the subscription, such as a subscription detail and a status of use of the subscribed device, by accessing a Web page for a subscriber on the service server 10. The Web page for a subscriber includes a service main screen 71, which will be described later. For example, starting from the service main screen 71, the subscriber can confirm an account of the subscriber, a registered printer for the account, a service-subscription status of each registered printer, a status of use of each subscribed device, and the like. The status of use that can be confirmed may include, for example, a number of printed sheets, a remaining amount of a consumable, and the like. In addition, starting from the service main screen 71, the subscriber can perform addition of a registered device, change of the subscribed device, change of the subscription plan, cancellation and the like.

Note that, the service server 10 has payment information indicating whether a necessary compensation is appropriately paid out for each subscription.

(1-3) Configuration of Service Server

As shown in FIG. 1, the service server 10 includes a controller 11, a storage unit 12 and a communication I/F 13. 'I/F' is an abbreviation of interface.

The controller 11 includes, for example, a CPU. The storage unit 12 includes, for example, a semiconductor memory such as a ROM, a RAM, an NVRAM and a flash memory. Specifically, the service server 10 of the present example includes a microcomputer having a CPU and a semiconductor memory.

The controller 11 is configured to execute a program stored in the storage unit 12, thereby implementing various functions. In the present example, the storage unit 12 corresponds to a non-transitory computer-readable storage medium having a program stored thereon.

Note that, a variety of functions implemented by the controller 11 are not limited to the configuration where they are implemented by the execution of the program. For example, some or all of the functions may also be implemented using one or more hardware.

The communication I/F 13 is an interface for performing communication with other apparatuses. The communication I/F 13 may be compatible with a wired LAN, a wireless LAN and a variety of other communication methods, for example. In the present example, the communication I/F 13 is connected to the WAN 150.

In the storage unit 12, a server program 21 and a database 22 are stored. The database 22 is managed by the server program 21. The server program 21 has a function of providing the device management service. That is, a variety of functions pertaining to the device management service are basically implemented by the server program 21. Note that, in descriptions below, a subject (for example, the controller 11 of the service server 10) configured to execute the program may be simply referred to as a program name or a software name. For example, the description 'server program 21' may specifically mean 'the controller 11 configured to execute the server program 21'.

(1-4) Configurations of First and Second Devices

Figure 2A:
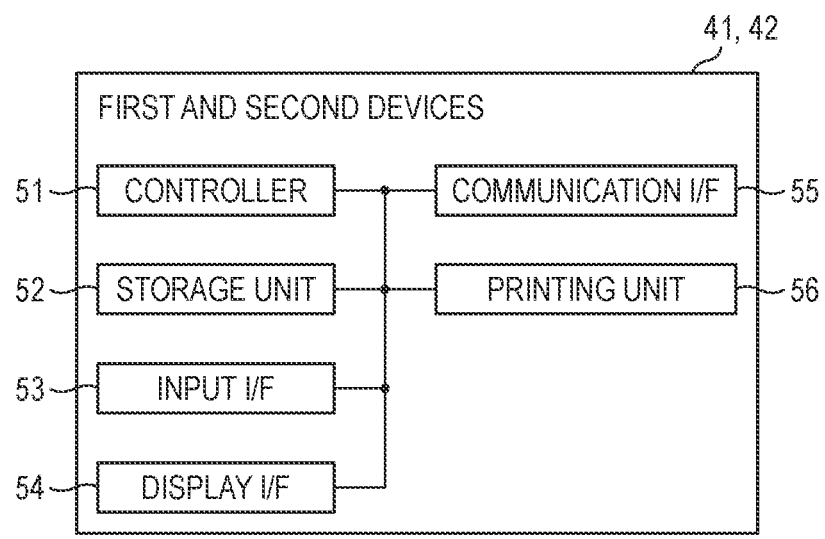
FIG. 2A is a block diagram of first and second devices.

The first and second devices 41 and 42 are specifically described with reference to FIG. 2A. In the present example, the first and second devices 41 and 42 differ in detail but have functional blocks that share common functions. FIG. 2A shows only the functional blocks that share common functions.

As shown in FIG. 2A, each of the first and second devices 41 and 42 has a controller 51, a storage unit 52, an input I/F 53, a display I/F 54, a communication I/F and a printing unit 56.

The controller 51 includes, for example, a CPU. The storage unit 52 unit includes, for example, a semiconductor memory such as a ROM, a RAM, an NVRAM and a flash memory. Specifically, each of the first and second devices 41 and 42 of the present example includes a microcomputer having a CPU and a semiconductor memory. In the storage unit 52, a variety of software and data are stored. The controller 51 is configured to execute the various programs stored in the storage unit 52, thereby implementing various functions. Note that, the various functions implemented by the controller 51 are not limited to the configuration where they are implemented by the execution of the programs (i.e., by software processing). For example, some or all of the functions may also be implemented using one or more hardware.

The input I/F 53 has a device for input for receiving a variety of input operations performed by a user. The device for input provided to the input I/F 53 may include, for example, an operation switch (not shown), a touch panel (not shown), and the like. The display I/F 54 has a display device capable of displaying an image, such as a liquid crystal monitor and an organic EL display, for example. The communication I/F 55 is an I/F for connecting the first and second devices 41 and 42 to the communication network 100. The printing unit 56 is configured to implement the above-described printing function.

Note that, in the present example, each of the first and second devices 41 and 42 can communicate with the service server 10 by using a communication protocol of XMPP (Extensible Messaging and Presence Protocol), for example.

(1-5) Configuration of Information Processing Apparatus

The information processing apparatus 60 is a variety of information processing apparatuses such as a smart phone, a tablet terminal, a mobile personal computer and a stationary personal computer, for example.

Figure 2B:
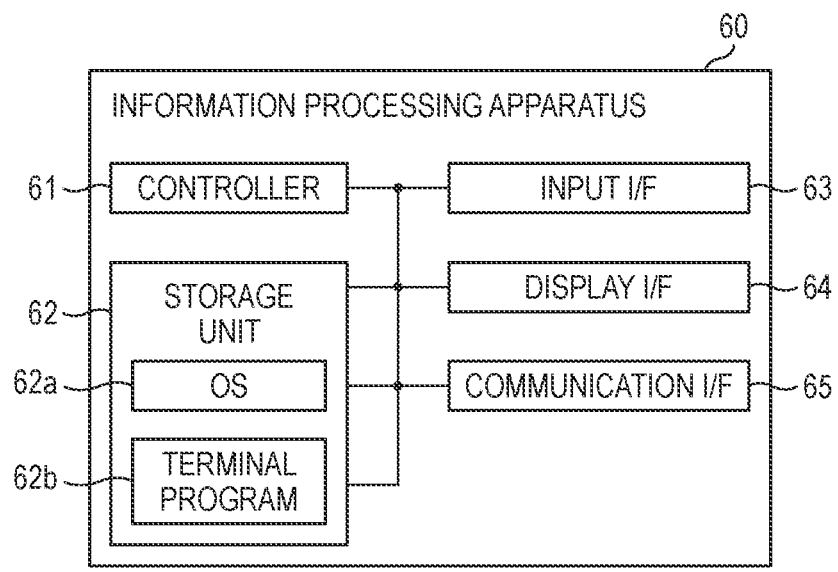
FIG. 2B is a block diagram of an information processing apparatus 60.

As shown in FIG. 2B, the information processing apparatus 60 includes a controller 61, a storage unit 62, an input I/F 63, a display I/F 64 and a communication I/F 65.

The controller 61 includes, for example, a CPU. The storage unit 62 includes, for example, a semiconductor memory such as a ROM, a RAM, an NVRAM and a flash memory. Specifically, the information processing apparatus 60 of the present example includes a microcomputer having a CPU and a semiconductor memory.

The controller 61 is configured to execute a program stored in the storage unit 62, thereby implementing various functions. In the present example, the storage unit 62 corresponds to a non-transitory computer-readable storage medium having a program stored thereon. Note that, a variety of functions implemented by the controller 61 are not limited to the configuration where they are implemented by the execution of the program. For example, some or all of the functions may also be implemented using one or more hardware.

The input I/F 63 has a device for input for receiving a variety of input operations performed by a user. The device for input provided to the input I/F 63 includes, for example, a touch panel. The display I/F 64 has a display device capable of displaying an image, such as a liquid crystal monitor and an organic EL display, for example. The communication I/F 65 is an I/F for connecting the information processing apparatus 60 to the communication network 100.

In the storage unit 62, an OS 62a and a terminal program 62b are stored. The OS 62a and the terminal program 62b are installed in a computer system.

The terminal program 62b is used to enjoy the device management service. The subscriber of the first subscription can acquire a variety of information pertaining to the first subscription by accessing the service server 10. One of tools configured to acquire the various information is the terminal program 62b. The terminal program 62b has a function of acquiring and displaying, on the display I/F 64, the various information pertaining to the first subscription by communicating with the service server 10 (specifically, communicating with the server program 21). In addition, the terminal program 62b has a function of transmitting, to the server program 21, various information, requests and the like input via the input I/F 63 by a user such as an administrator.

In the present example, the terminal program 62b has, for example, a function of a Web browser. Note that, the server program 21 of the service server 10 has, for example, a function of a Web server. Therefore, the terminal program 62b of the present example is configured to communicate with the server program 21 of the service server 10 by using a communication protocol of HTTP or HTTPS, for example.

(1-6) Data Tables that are Managed by Database

Figure 3:
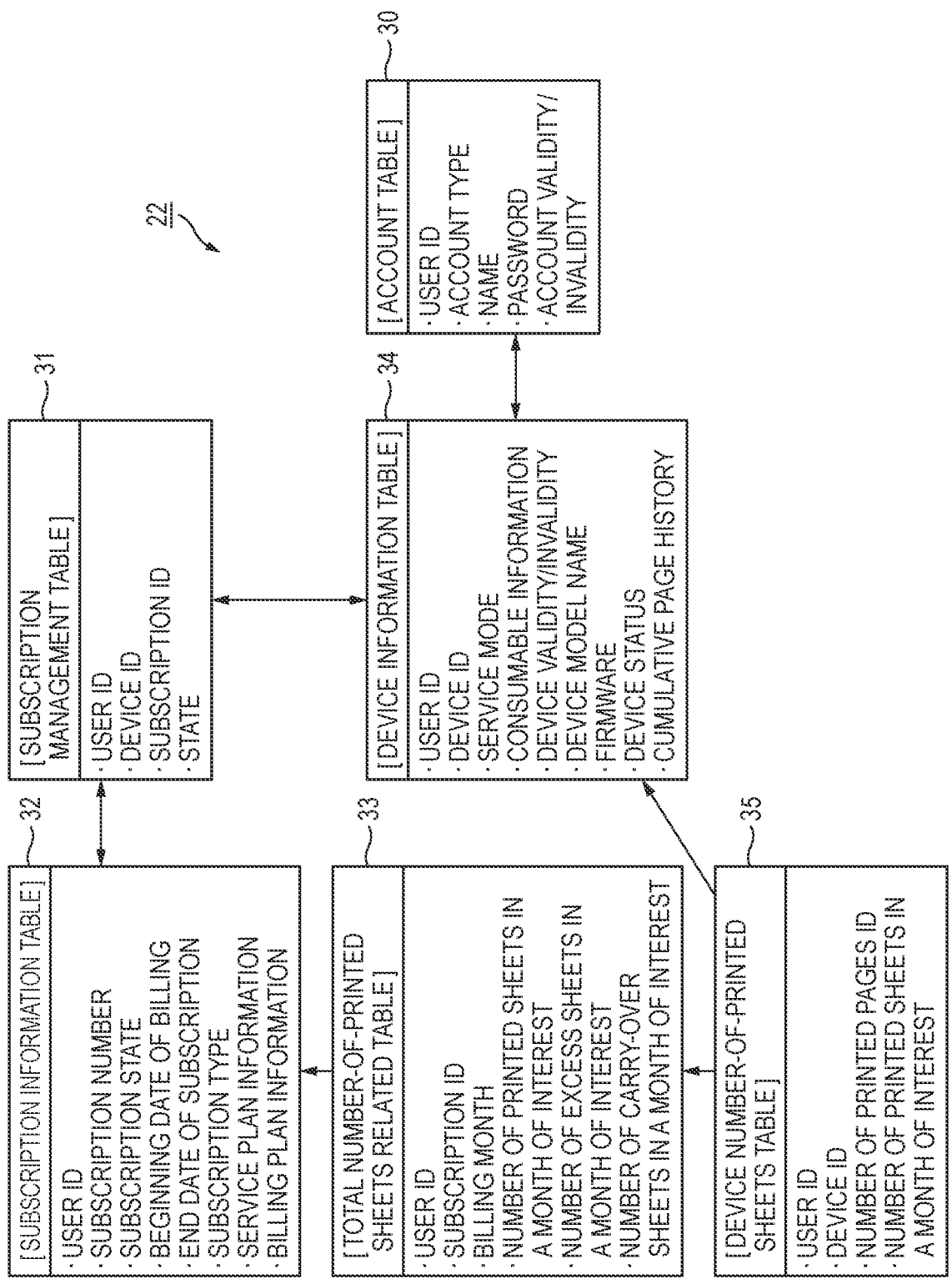
FIG. 3 illustrates a variety of tables that are registered in a database of a service server.

Next, a data table group generated in the database 22 of the service server 10 for each subscription in the device management service is described with reference to FIG. 3. FIG. 3 shows an example of a data table group pertaining to the first subscription. The first subscription is concluded, so that a data table group as shown in FIG. 3 is established in the database 22.

As shown in FIG. 3, the data table group includes an account table 30, a subscription management table 31, a subscription information table 32, a total number-of-printed sheets related table 33, a device information table 34, and a device number-of-printed sheets table 35.

As shown in FIG. 3, the account table 30 includes basic information pertaining to a subscriber, such as a user ID and an account type. The user ID is to identify a subscriber. The account type is set to any one of a plurality of types. In the present example, for example, one of "customer", "administrator" and "system" is set as the account type. In general, a user who receives a service is set to the account type "customer" when registering an account. Note that, the account type corresponds to an example of the subscriber information of the present disclosure.

The device information table 34 is individually generated each time a device is registered, i.e., for each registered device. The device information table 34 is associated with the account table 30. As shown in FIG. 3, the device information table 34 includes device information records pertaining to a registered device, in addition to the user ID. As shown in FIG. 3, the device information records include, for example, a device ID, a device validity/invalidity setting and a variety of other information pertaining to the registered device. The device ID is to identify a device. The device validity/invalidity setting indicates whether the device subscribes to a service. When the device subscribes to a service, the device validity/invalidity setting is set to 'validity'. Note that, the device information table 34 shown in FIG. 3 includes a device information record, i.e., a first device information record 34a of the first device 41, which is a currently subscribed device of the first subscription. In the device information table 34, the user ID corresponds to an example of the first user information and the second user information of the present disclosure, and the device ID corresponds to an example of the first identification information of the present disclosure.

The subscription management table 31 includes information pertaining to a content of a service to which the user who has registered an account subscribes. The subscription management table 31 is associated with the device information table 34 of the device in subscription to the service.

As shown in FIG. 3, the subscription information table 32 includes a variety of information indicative of specific contents of the service in subscription. The device information table 32 is associated with the subscription management table 31.

The device number-of-printed sheets table 35 is individually generated for each registered device. The device number-of-printed sheets table 35 is associated with the device information table of the corresponding registered device. As shown in FIG. 3, the device number-of-printed sheets table 35 includes device number-of-printed sheets records pertaining to a registered device, in addition to the user ID. As shown in FIG. 3, the device number-of-printed sheets records include, for example, a device ID, a number of printed sheets in a month of interest, and the like. The number of printed sheets in a month of interest is a number of sheets printed in a month of interest (a month of a current subscription unit) on the corresponding registered device. The device number-of-printed sheets table 35 is associated with the device information table 34 and the total number-of-printed sheets related table 33. Note that, the device number-of-printed sheets table 35 shown in FIG. 3 includes a device number-of-printed sheets record, i.e., a first device number-of-printed sheets record 35a of the first device 41, which is a currently subscribed device of the first subscription. The device information table 34 and the device number-of-printed sheets table 35 correspond to an example of the usage information of the present disclosure.

The total number-of-printed sheets related table 33 is not individually generated for each registered device but one common table is generated for one subscription. As shown in FIG. 3, the total number-of-printed sheets related table 33 includes a number of printed sheets in a month of interest, a number of excess sheets in a month of interest, and the like. The number of printed sheets in a month of interest is a total number of sheets printed on the subscribed device of the subscription in a month of interest. The number of excess sheets in a month of interest is a number of excess sheets when the number of printed sheets in a month of interest exceeds a contracted number of printed sheets. The total number-of-printed sheets related table 33 is associated with the subscription information table. The total number-of-printed sheets related table 33 is further associated with the device number-of-printed sheets table 35 (specifically, a device number-of-printed sheets record of the currently subscribed device) corresponding to the subscribed device. Note that, the total number-of-printed sheets related table 33 corresponds to an example of the service utilization information (1-7) Outline of Exchange of Device Subjected to Subscribe For example, it is expected that there occurs a demand to replace the currently subscribed device with another device, like a case where the subscribed device has a breakdown, a case where the user wants to use another device having a function, which the subscribed device does not have, and the like. In this case, in the present example, after registering another device, processing of switching the subscribed device from the current device to another device is performed.

Figure 4B:
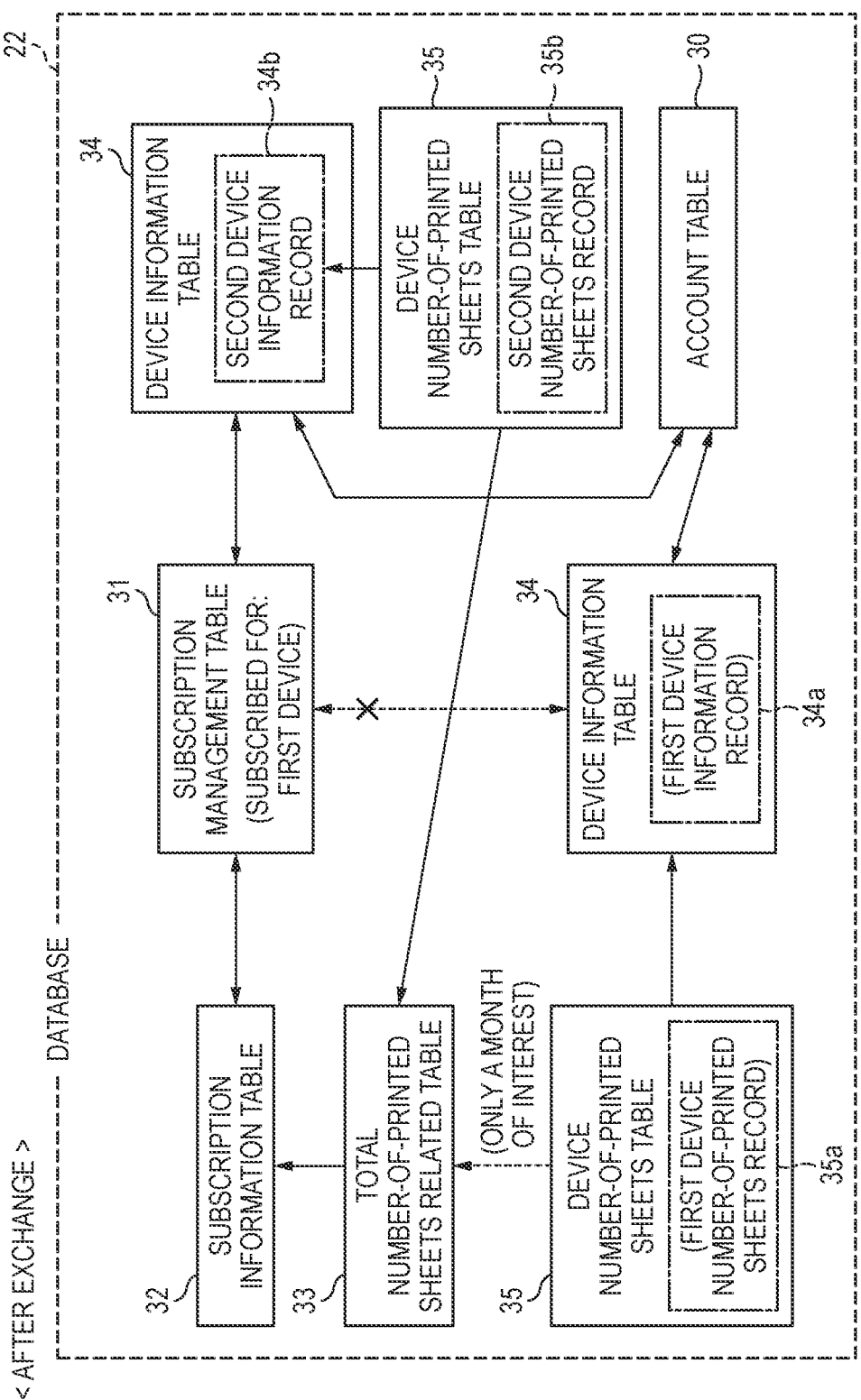

At this time, for another device, the tables 30 to 35 shown in FIG. 3 are not separately newly generated, and some tables are continuously referred to. Specifically, as shown in FIGS. 4A and 4B, for example, when the subscribed device is exchanged from the first device 41 to the second device 42, a second device information record 34b of the device information table 34 and a second device number-of-printed sheets record 35b of the device number-of-printed sheets table 35 are newly generated. That is, in the device information table 34, the second device information record 34b is newly generated separately from the existing first device information record 34a. In the device number-of-printed sheets table 35, the second device number-of-printed sheets record 35b is newly generated separately from the existing first device number-of-printed sheets record 35a. After exchange of the subscribed device, in the device information table 34, the second device information record 34b is referred to, instead of the first device information record 34a, and in the device number-of-printed sheets table 35, the second device number-of-printed sheets record 35b is referred to, instead of the first device number-of-printed sheets record 35a. The second device information record 34b indicates the information of the second device 42, which is a new subscribed device of the first subscription. The type of the information included in the second device information record 34b is basically similar to the type of the information of the first device information record 34a. The second device number-of-printed sheets record 35b includes a number of printed sheets in a month of interest, which is a number of sheets printed in a month of interest (a month of a current subscription unit) on the second device. The type of the information included in the second device number-of-printed sheets record 35b is basically similar to the type of the information of the first device number-of-printed sheets record 35a. The other several tables including the total number-of-printed sheets related table 33 are not also separately generated for the second device 42 but the tables already generated and referred to before exchange are continuously referred to.

That is, as shown in FIGS. 4A and 4B, the association of the first device information record 34a of the device information table 34 with the subscription management table 31 is canceled, and the subscription management table 31 is associated with the new second device information record 34b. In addition, the association of the first device number-of-printed sheets record 35a of the device number-of-printed sheets table 35 with the total number-of-printed sheets related table is canceled, and the total number-of-printed sheets related table is associated with the new second device number-of-printed sheets record 35b. However, for a month of interest in which the exchange has been performed, the total number-of-printed sheets related table 33 is updated with reference to both the first device number-of-printed sheets record 35a and the second device number-of-printed sheets record 35b for correct charging for a month of interest. The first device information record 34a and the first device number-of-printed sheets record 35a may remain undeleted, although not referred to.

Note that, the device ID of the second device information 42, which is included in the second device information record 34b, corresponds to an example of the second identification information of the present disclosure. In addition, the first device number-of-printed sheets record 35a corresponds to an example of the first usage information of the present disclosure, and the second device number-of-printed sheets record 35b corresponds to an example of the second usage information of the present disclosure.

When calculating the number of printed sheets for each subscription month (i.e., when updating the total number-of-printed sheets related table 33), if the subscribed device is exchanged from the first device 41 to the second device 42 in the middle of the subscription month, the server program 21 refers to the first device number-of-printed sheets record 35*a* of the first device 41 before exchange (hereinafter, referred to as 'old device') with respect to the number of printed sheets before exchange, and refers to the second device number-of-printed sheets 35*b* of the second device 42 after exchange (hereinafter, referred to as 'new device') with respect to the number of printed sheets after exchange.

(1-8) Processing Pertaining to Service Provision

Figure 6A:
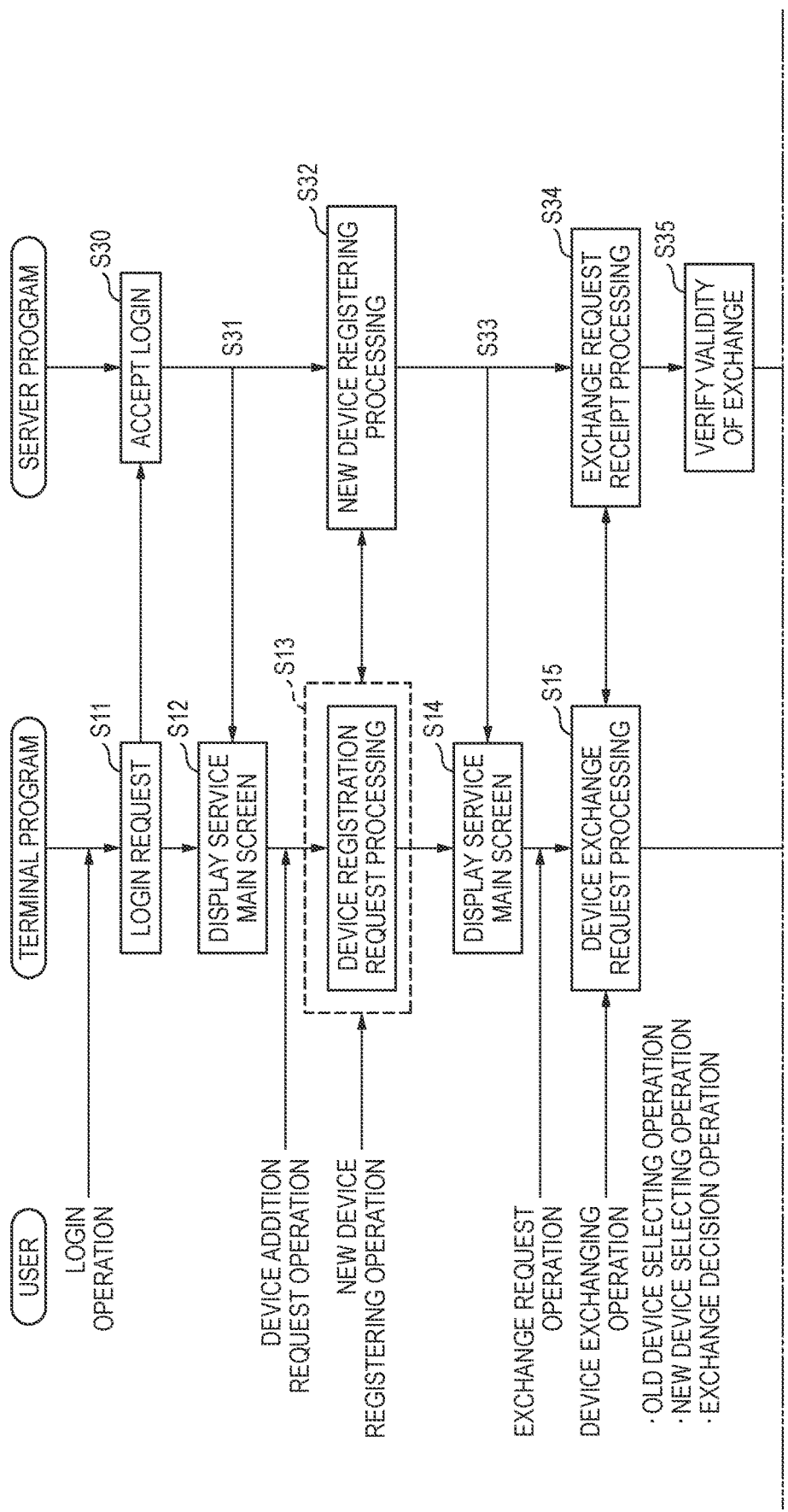
FIGS. 6A and 6B are a sequence diaphragm showing a part of processing that is performed in the device service system when exchanging the subscribed device.
Figure 6B:
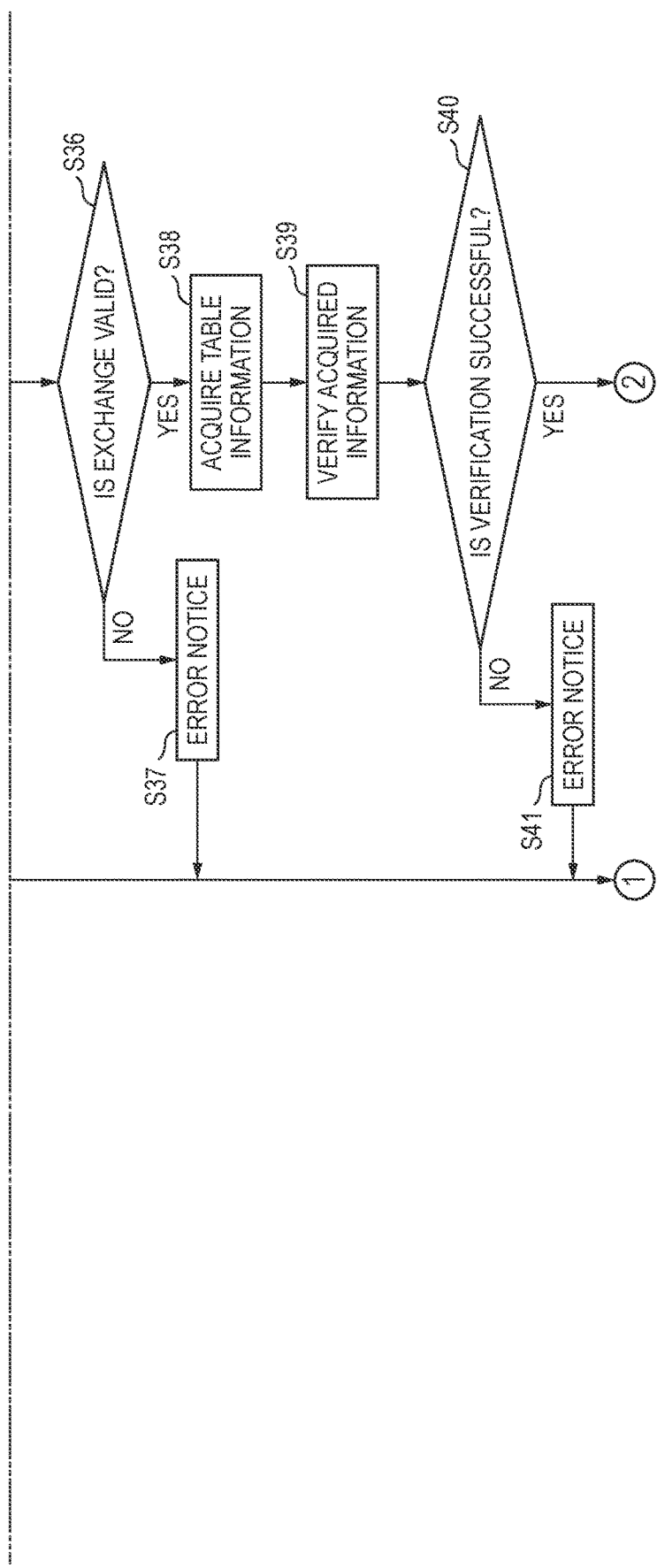
Figure 7:
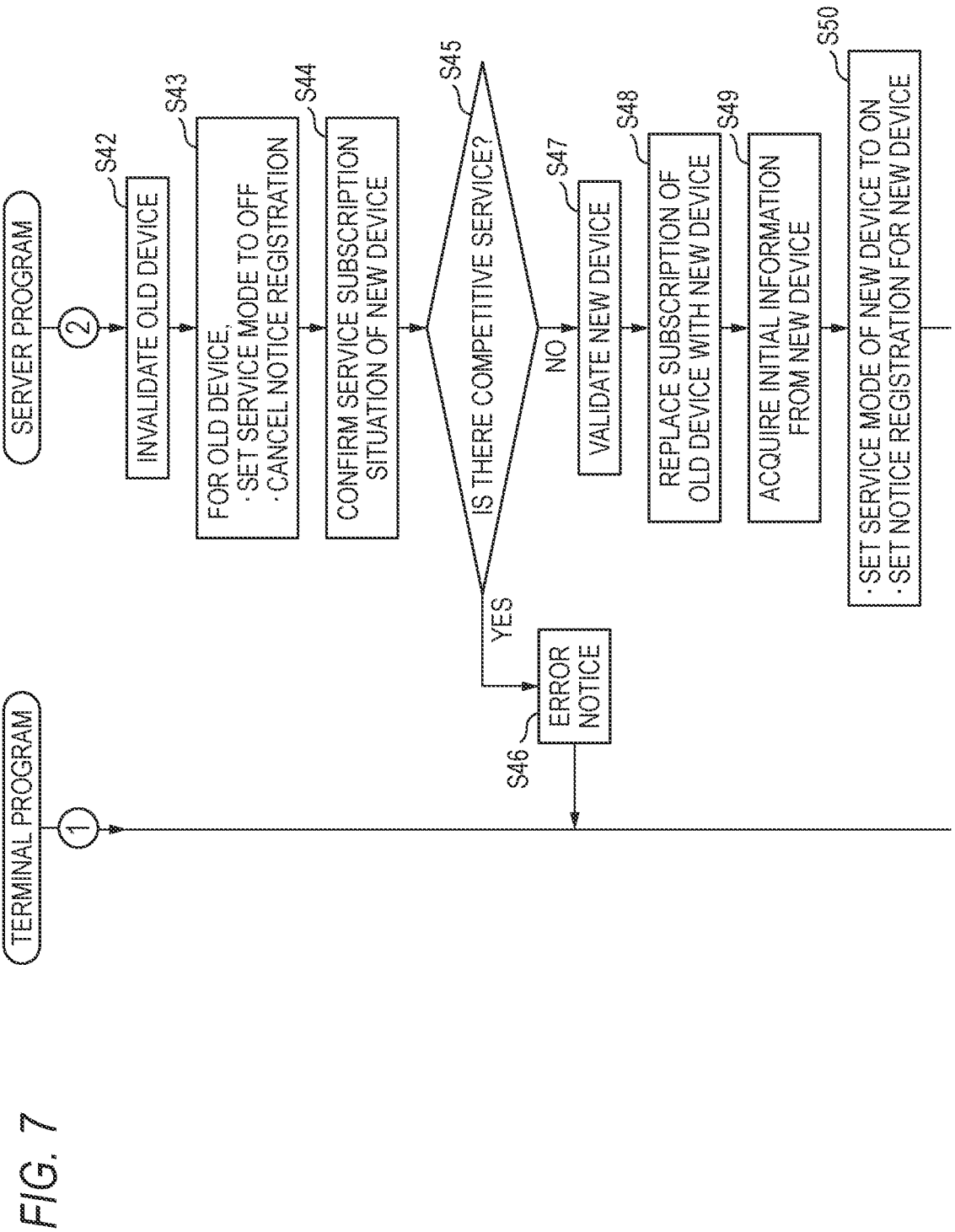
FIG. 7 is a sequence diaphragm showing a remainder of the processing that is performed in the device service system when exchanging the subscribed device.

Processing that is performed on the service server 10 so as to provide the device management service, i.e., processing that is performed according to the server program 21 is described with reference to FIGS. 5 to 7.

(1-8-1) Periodic Notice Handling Processing

Figure 5:
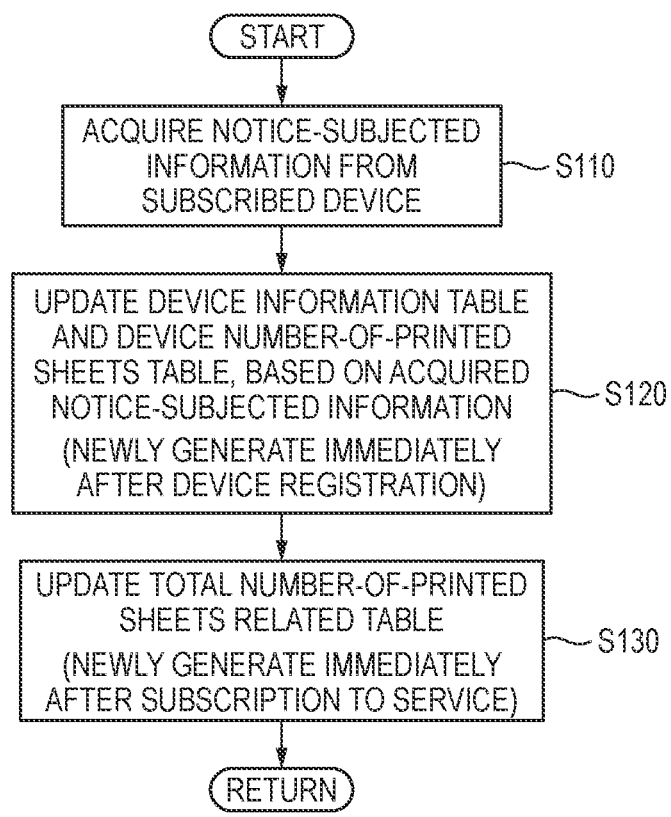
FIG. 5 is a flowchart of periodic notice handling processing.

The controller 11 of the service server 10 periodically performs periodic notice handling processing shown in FIG. 5 at the above-described notice interval. The periodic notice handling processing is included in the server program 21.

When the controller 11 starts the periodic notice handling processing, the controller 11 acquires notice-subjected information from the subscribed device, in S110. Based on the notice-subjected information acquired in S110, the controller 11 updates the device information table 34 (specifically, the device information record 34*a* of the currently subscribed device) and the device number-of-printed sheets table 35 (specifically, the device number-of-printed sheets record 35*a* of the currently subscribed device), in S120.

In S130, the controller 11 updates the total number-of-printed sheets related table 33 by reflecting an update result by S120 on the total number-of-printed sheets related table 33. For example, in a case where the number of printed sheets in a month of interest in the device number-of-printed sheets table 35 is updated from 30 sheets to 40 sheets (i.e., increases by 10 sheets) by the processing of S120, the controller 11 adds 10 to the current number of printed sheets in a month of interest in the total number-of-printed sheets related table 33. Such periodic notice handling processing is repeatedly performed on a periodic basis, so that the device information table 34, the device number-of-printed sheets table 35 and the total number-of-printed sheets related table 33 are updated.

In addition, in a case where the subscribed device is changed from the first device 41 to the second device 42, as described above, in the device information table 34, the second device information record 34*b* is generated while leaving the first device information record 34*a*, and in the device number-of-printed sheets table 35, the second device number-of-printed sheets record 35*b* is generated while leaving the first device number-of-printed sheets record 35*a*. Then, the update of the total number-of-printed sheets related table 33 after change is performed while referring to the second device number-of-printed sheets record 35*b*.

As a result, in a billing month (corresponds to an example of a certain period of the present disclosure) in which the subscribed device has been exchanged, the number of printed sheets in a month of interest of the total number-of-printed sheets related table 33 is calculated as follows. That is, the number of printed sheets in a month of interest from a beginning of the billing month to the time of exchange is calculated (updated) while referring to the number of printed sheets in a month of interest of the first device number-of-printed sheets record 35*a*. On the other hand, regarding the number of printed sheets in a month of interest after the time of exchange until an end of the billing month, the number of printed sheets in a month of interest at the time of exchange is calculated (updated by addition) while referring to the number of printed sheets in a month of interest of the second device number-of-printed sheets record 35*b*.

(1-8-2) Processing Pertaining to Subscribed Device Exchange

Next, processing that is performed on the device service system 1 at the time of exchange of the subscribed device is described with reference to FIGS. 6A, 6B and 7. Here, it is assumed that the subscribed device of the first subscription is exchanged from the first device (old device) 41 to the second device (new device) 42.

In order to exchange the subscribed device to the new device, the user first activates the terminal program 62*b* (in the present example, for example, a Web browser) on the information processing apparatus 60 so as to log in the service server 10, and accesses and causes the service server 10 to display a login screen on the display I/F 64 of the information processing apparatus 60. Then, the user performs a login operation including inputting necessary information.

This causes the terminal program 62*b* to transmit a login request to the server program 21, together with the information input by the login operation (S11). The server program 21 receiving the login request from the terminal program 62*b* accepts the login request (S30). As a result, the login of the user is accepted.

Figure 8:
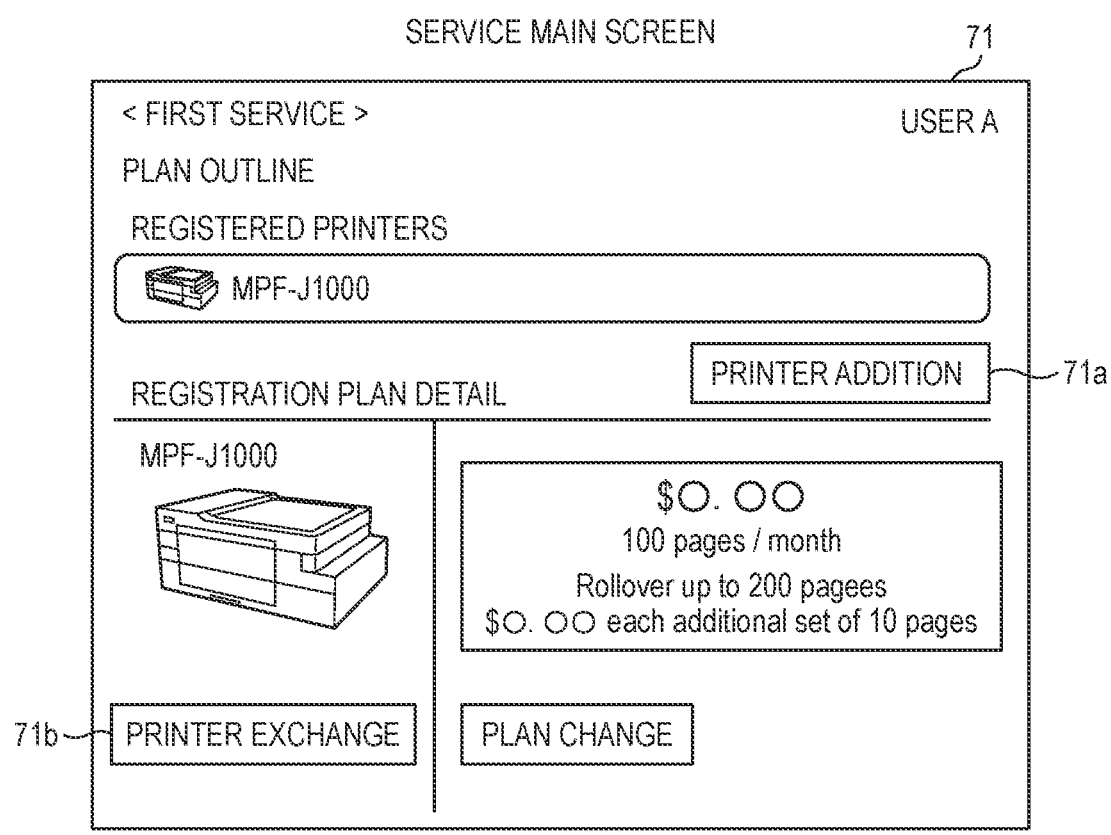
FIG. 8 illustrates an example of a service main screen.

The server program 21 receiving the login of the user transmits screen information of a service main screen 71 (refer to FIG. 8) corresponding to the login user to the terminal program 62*b* (S31). The terminal program 62*b* receiving the screen information displays the service main screen 71 on the display I/F 64, based on the screen information (S12).

When the service main screen 71 is displayed, the user performs a device addition request operation for registering a new device. Specifically, the user taps or clicks an addition button 71*a* displayed in the service main screen 71.

When the terminal program 62*b* receives the device addition request operation, the terminal program 62*b* performs device registration request processing. Specifically, the terminal program first displays a device registering screen (not shown) for receiving registration of a new device. Then, the terminal program accepts a user's new device registering operation, starting from the device registering screen. The new device registering operation also includes an operation on a new device. When a new device is selected by the new device registering operation and a registering instruction is performed by the user, the terminal program 62*b* requests the server program 21 to register the new device.

The server program 21 receiving the request performs new device registering processing for registering the new device for the device management service (S32). This processing includes generating the new second device information record 34*b* and second device number-of-printed sheets record 35*b* corresponding to the new device. Note that, at this point of time, the new device has not been registered yet as a subscribed device of the first subscription, and the subscribed device of the first subscription is still the old device. When the new device is registered, the second device information record 34*b* of the new device is associated with the account table 30, as shown in FIGS. 4A and 4B.

When the server program 21 registers the new device, the server program 21 transmits screen information of the service main screen corresponding to the login user to the terminal program 62b (S33). The terminal program 62b receiving the screen information displays the service main screen 71 on the display I/F 64, based on the screen information (S14). Although not shown in FIG. 8, on the service main screen 71 that is here displayed, the new device is also displayed, in addition to the old device that is the currently subscribed device, as a list of the registered devices.

When the service main screen 71 is displayed in S14, the user performs an exchange request operation for exchanging the subscribed device. Specifically for example, the user taps or clicks an exchange button 71b displayed in the service main screen 71. When the terminal program 62b receives the exchange request operation, the terminal program 62b performs device exchange request processing (S15). Specifically, the terminal program displays an exchange receipt screen (not shown) for urging the user to select a device to be exchanged. Starting from the exchange receipt screen, the terminal program accepts an old device selecting operation and a new device selecting operation performed by the user. This allows the terminal program 62b to recognize the new device and the old device. The terminal program 62b further accepts an exchange decision operation performed by the user. The terminal program 62b receiving the exchange decision operation transmits an exchange request to the server program 21. That is, the terminal program requests the server program 21 to change the subscribed device from the current old device to the new device.

The server program 21 receiving the exchange request from the terminal program 62b performs exchange request receipt processing (S34). For example, the server program perceives the new device and the old device. Then, the server program verifies validity of exchange (S35).

Specifically, for example, the server program confirms whether the account type of the login user is 'customer' with reference to the account table 30 of the login user. When the account type is 'customer', the server program tentatively determines that there is validity, and when the account type is one other than 'customer', the server program determines that there is no validity.

In addition, for example, the server program determines whether the old device and the new device are the same with reference to the device IDs of the device information records 34a and 34b. When the device IDs coincide with each other, the server program determines that the old device and the new device are the same. In this case, the server program determines that there is no validity. When the device IDs do not coincide with each other, the server program determines that the old device and the new device are not the same. In this case, the server program determines that there is validity. In this way, the server program verifies the presence or absence of the validity, in terms of several verification items.

The server program 21 performing the verification of validity determines whether the exchange is valid, based on the verification result (S36). When the verification results by S35 all indicate that there is validity, the server program 21 determines that the exchange is valid. On the other hand, when there is a verification item for which it is determined that there is no validity, the server program determines that the exchange is not valid.

When it is determined that the exchange is not valid (S36: NO), the server program 21 transmits an error notice to the terminal program 62b (S37). The terminal program 62b receiving the error notice notifies via the display I/F 64 that the exchange has been refused. When it is determined that the exchange is valid (S36: YES), the server program 21 acquires the table information (S38). That is, the server program acquires the respective data table groups (refer to FIGS. 4A and 4B) of the old device and the new device. Then, the server program verifies the acquired data table groups (S39). The purpose of this verification is to confirm whether the exchange can be allowed, similar to the verification of S35.

In S39, for example, the server program determines whether both the old device and the new device are associated by the same login user. This determination is performed, for example, by confirming whether both the first device information record 34a of the old device and the second device information record 34b of the new device are associated with the same account table 30. That is, the server program confirms whether both the first device information record 34a and the second device information record 34b belong to the same login user. When the respective device information records 34a and 34b are associated with the same account table 30 (i.e., the user IDs of the respective device information records 34a and 34b are the same), the server program determines that the verification is OK. On the other hand, when the respective device information records 34a and 34b are not associated with the same account table 30 (i.e., the user IDs of the respective device information records 34a and 34b are different), the server program determines that the verification is NG.

In addition, for example, in S39, the server program determines whether payment of compensation for the service is appropriately made by the login user. This determination may be performed based on the above-described payment information that is managed by the service server 10, for example. For example, in a case where the payment is not appropriately made, such as delinquency in payment, the server program determines that the verification is NG. On the other hand, when the payment is appropriately made, the server program determines that the verification is OK.

In addition, for example, in S39, the server program determines whether the old device and the new device are valid, respectively. Specifically, the server program confirms the setting of 'the device validity/invalidity' in the device information records 34a and 34b of the respective devices. In a case where the setting is 'validity', the server program determines that the verification is OK, and in a case where the setting is 'invalidity', the server program determines that the verification is NG.

In addition, for example, in S39, the server program determines presence or absence of the association of the old and new devices with the subscription. Specifically, the server program confirms the subscription state (validity or invalidity) set for each registered device in the subscription management table 31. When the subscription state is set to validity, the server program determines that the device is associated with the subscription, and when the subscription state is set to invalidity, the server program determines that the device is not associated with the subscription. In a case where the old device is set to validity, the server program determines that the old device is currently associated with the subscription, and determines that the verification is OK. On the other hand, in a case where the old device is set to invalidity, the server program determines that the verification is NG. As for the new device, contrary to the old device, in a case where the subscription state is set to invalidity, the server program determines that the verification is OK, and in a case where the subscription state is set to validity, the server program determines that the verification is NG.

Further, for example, in S39, the server program determines whether the new device meets the above-described subscription-allowed conditions. That is, the server program determines whether the new device also continues to meet the subscription conditions that the old device in subscription currently meets (in other words, the subscription compatibility). In a case where the new device meets the subscription-allowed conditions, the server program determines that the verification is OK, and in a case where the new device does not meet the subscription-allowed conditions, the server program determines that the verification is NG.

When the verification on the necessary items is performed in this way, the server program 21 determines whether the verification is successful (S40). Specifically, in a case where the respective verifications performed in S39 are all 'verification OK', the server program determines that the verification is successful. On the other hand, in a case where there is an item of verification NG in S39, the server program determines that the verification fails.

When it is determined that the verification fails (S40: NO), the server program 21 transmits an error notice to the terminal program 62b (S41). The terminal program 62b receiving the error notice notifies via the display I/F 64 that the verification has failed (i.e., the exchange has been refused). When it is determined that the verification is successful (S40: YES), the server program 21 invalidates the old device (S42 in FIG. 7). Specifically, the server program 21 sets the setting of the device validity/invalidity to 'invalidity' in the first device information record 34a of the device information table 34.

The server program 21 invalidating the old device further sets a service mode to 'OFF' and cancels the notice registration, with respect to the old device (S43). These operations are directly performed for the old device. That is, for a device that meets the subscription-allowed conditions, the service mode indicating whether the device receives a service is set, and this setting is set to 'OFF'. In addition, since the above-described periodic notice is no longer necessary for the old device, the periodic notice is canceled so that the periodic notice is not performed from the old device.

Then, the server program 21 confirms a service-subscription status of the new device (S44). That is, the server program confirms whether the new device has already subscribed (contracted) to a service different from the device management service for subscribing from now. Based on a result of the confirmation, the server program determines whether the new device has already subscribed to another service that has a competitive relationship with the device management service for subscribing from now. The competitive relationship includes a relationship of an overlap at least partially between functions of mutual services. For example, in a case where there is another service specialized in only an automatic ordering of a consumable, which is one function of the device management service, another service has a competitive relationship with the device management service.

In a case where the new device has already subscribed to another service having a competitive relationship (S45: YES), the server program 21 transmits an error notice to the terminal program 62b (S46). The terminal program 62b receiving the error notice notifies via the display I/F 64 that the exchange has been refused. In a case where the new device has not subscribed to another service having a competitive relationship (S45: NO), the server program 21 validates the new device (S47). Specifically, the server program 21 sets the setting of the device validity/invalidity to 'validity' in the second device information record 34b of the device information table 34.

The server program 21 validating the new device replaces the subscription of the old device with the new device (S48). That is, here, the subscribed device is changed. Specifically, as described with reference to FIGS. 4A and 4B, the server program associates the second device information record 34b as a device information record belonging to the device information table 34, and associates the second device number-of-printed sheets record 35b as a device number-of-printed sheets record belonging to the device number-of-printed sheets table 35. Then, the server program changes the association among the tables, as shown in 'After Change' in FIGS. 4A and 4B. As a result, when updating the total number-of-printed sheets related table 33, a record of a reference destination in the device number-of-printed sheets table 35 is switched from the first device number-of-printed sheets record 35a to the second device number-of-printed sheets record 35b.

The server program 21 changing the subscribed device acquires the initial information (the current information such as the number of printed sheets) from the new device (S49), and reflects the same on the second device number-of-printed sheets record 35b and the like of the new device.

In addition, the server program 21 sets the service mode to 'ON' and sets the notice registration, with respect to the new device (S50). This allows the notice-subjected information to be periodically transmitted from the new device.

Note that, in the present example, the server program 21 corresponds to an example of the computer-readable instructions of the present disclosure. The processing of S110 corresponds to an example of the acquiring of the usage information of the present disclosure. The processing of S120 corresponds to an example of the storing of the usage information of the present disclosure. The processing of S130 corresponds to an example of the generating of the service utilization information of the present disclosure. The processing of S34 corresponds to an example of the acquiring of the exchange request of the present disclosure. The processing of S35, S36, S38 to S40, S44 and S45 corresponds to an example of the determining of the present disclosure. The processing of S48 corresponds to an example of the changing of the subscribed device of the present disclosure.

2. Other Examples

Although the above example of the present disclosure has been described, the present disclosure is not limited to the above-described example and can be variously modified and implemented.

(1) The verification items of the validity of exchange in S35 are not limited to the items exemplified in the above-described example. In addition to the above-exemplified items or instead of at least some of the above-exemplified items, other verification items may also be provided.

(2) The verification items of the data table group in S39 are not limited to the items exemplified in the above-described example. In addition to the above-exemplified items or instead of at least some of the above-exemplified items, other verification items may also be provided.

(3) The functions of the server program 21 in the service server 10 may be configured by a plurality of servers that is physically different. The functions of the server program 21 may be shared among a plurality of servers. In addition, the service server 10 may be provided as a so-called virtual server.

(4) In the above-described example, the plurality of functions of one constitutional element may be implemented by the plurality of constitutional elements, or one function of one constitutional element may be implemented by the plurality of constitutional elements. In addition, the plurality of functions of the plurality of constitutional elements may be implemented by one constitutional element, or one function that is implemented by the plurality of constitutional element may be implemented by one constitutional element. Further, some of the configurations of the above-described example may be omitted. In addition, at least some of the configurations of the above-described example may be added or replaced with respect to other examples.

What is claimed is:

1. A non-transitory computer-readable storage medium storing computer-readable instructions, wherein the computer-readable instructions, when executed by a computer of a server, cause the server to perform:
    acquiring device-usage information, which indicates a status of use of a subscribed device that is a device subscribing to a service, from the subscribed device;
    generating service-usage information indicating a status of use of the service, based on the acquired usage information;
    acquiring an exchange request for changing the subscribed device from a first device currently subscribing to the service to a second device different from the first device; and
    changing the subscribed device from the first device to the second device, in response to the acquired exchange request; and
    the first device is a first printer; and
    the second device is a second printer.

2. The non-transitory computer-readable storage medium according to claim 1,
    wherein the server includes a storage unit that stores the usage information and the service utilization information,
    the computer-readable instructions cause the server to further perform:
        storing the acquired usage information in the storage unit to update the usage information stored in the storage unit, in response to the usage information being acquired, based on the acquired usage information; and
        generating the service utilization information with reference to the usage information stored in the storage unit.

3. The non-transitory computer-readable storage medium according to claim 2,
    wherein the computer-readable instructions cause the server to perform the storing to:
        store first usage information indicating a first status of use of the first device in the storage unit, as the device-usage information, before the exchange request is acquired in the acquiring of the exchange request; and
        store second usage information indicating a second status of use of the second device in the storage unit, as the device-usage information, after the exchange request is acquired in the acquiring of the exchange request.

4. The non-transitory computer-readable storage medium according to claim 3,
    wherein the computer-readable instructions cause the server to perform the storing to separately store the second usage information while leaving the first usage information in the storage unit, in response to the subscribed device being changed from the first device to the second device in the changing.

5. The non-transitory computer-readable storage medium according to claim 4,
    wherein the computer-readable instructions cause the server to perform the generating to generate the service utilization information for a certain period including a time when the subscribed device is changed from the first device to the second device in the changing, based on the first status of use of the first device for a period from a beginning of the certain period to the time with reference to the first usage information stored in the storage unit, and the second status of use of the second device for a period from the time to an end of the certain period with reference to the second usage information stored in the storage unit.

6. The non-transitory computer-readable storage medium according to claim 1,
    wherein the computer-readable instructions cause the server to further perform:
        determining whether a change-allowed condition for performing the changing of the subscribed device is met, in response to the exchange request being acquired in the acquiring of the exchange request; and
        changing the subscribed device in response to being determined in the determining that the change-allowed condition is met.

7. The non-transitory computer-readable storage medium according to claim 6,
    wherein the server is configured to store subscriber information indicating a type of a subscriber who causes the subscribed device to subscribe to the service, and
    the change-allowed condition includes a condition that the type indicated by the subscriber information is any one of one or more specific types among a plurality of types.

8. The non-transitory computer-readable storage medium according to claim 6,
    wherein the server is configured to store:
        first identification information indicating the first device and inherent in the first device; and
        second identification information indicating the second device and inherent in the second device, and
    the change-allowed condition includes a condition that the second identification information is different from the first identification information.

9. The non-transitory computer-readable storage medium according to claim 6,
    wherein the server is configured to store:
        first user information indicating a user of the first device; and
        second user information indicating a user of the second device, and
    the change-allowed condition includes a condition that the first user information and the second user information indicate a same user, respectively.

10. The non-transitory computer-readable storage medium according to claim 6,
    wherein the server is configured to store payment information indicating whether payment of compensation for the service to which the subscribed device subscribes is appropriately made, and the change-allowed condition includes a condition that the payment information indicates that the payment of the compensation is appropriately made.

11. The non-transitory computer-readable storage medium according to claim 6,
wherein the first device is configured to meet a predetermined subscription-allowed condition for subscribing to the service, and
the change-allowed condition includes a condition that the second device meets the subscription-allowed condition.

12. The non-transitory computer-readable storage medium according to claim 6,
wherein the change-allowed condition includes a condition that the second device does not subscribe to another service having a competition relationship with the service to which the first device subscribes, and
the competition relationship includes a relationship of an overlap at least partially between a function of the service and a function of the another service.

13. A server comprising a controller configured to perform:
acquiring device-usage information, which indicates a status of use of a subscribed device that is a device subscribing to a service, from the subscribed device;
generating service-usage information indicating a status of use of the service, based on the acquired usage information;
acquiring an exchange request for changing the subscribed device from a first device currently subscribing to the service to a second device different from the first device; and
changing the subscribed device from the first device to the second device, in response to the acquired exchange request; and
the first device is a first printer; and
the second device is a second printer.

14. A service system comprising a server, a first device, a second device, and an information processing apparatus,
wherein the server includes a controller configured to perform:
acquiring device-usage information, which indicates a status of use of a subscribed device that is a device subscribing to a service, from the subscribed device;
generating service-usage information indicating a status of use of the service, based on the acquired usage information;
acquiring, from the information processing apparatus, an exchange request for changing the subscribed device from the first device currently subscribing to the service to the second device different from the first device; and
changing the subscribed device from the first device to the second device, in response to the acquired exchange request, and
the information processing apparatus is configured to perform:
receiving an instruction operation of instructing to change the subscribed device from the first device to the second device; and
transmitting the exchange request to the server, in response to the received instruction operation and
the first device is a first printer; and
the second device is a second printer.

15. A service providing method comprising the steps of:
acquiring device-usage information, which indicates a status of use of a subscribed device that is a device subscribing to a service, from the subscribed device;
generating service-usage information indicating a status of use of the service, based on the acquired usage information;
acquiring an exchange request for changing the subscribed device from a first device currently subscribing to the service to a second device different from the first device; and
changing the subscribed device from the first device to the second device, in response to the acquired exchange request; and
the first device is a first printer; and
the second device is a second printer.

16. The service providing method according to claim 15, further comprising the step of:
storing the acquired usage information in a storage unit to update the usage information stored in the storage unit, in response to the usage information being acquired, based on the acquired usage information; and
generating the service utilization information with reference to the usage information stored in the storage unit.

17. The service providing method according to claim 16,
wherein in the storing of the acquired usage information,
first usage information indicating a first status of use of the first device in the storage unit, as the usage information, is stored before the exchange request is acquired; and
second usage information indicating a second status of use of the second device in the storage unit, as the usage information, is stored after the exchange request is acquired.

18. The service providing method according to claim 17,
wherein in the storing of the acquired usage information,
the second usage information while leaving the first usage information is separately stored in the storage unit, in response to the subscribed device being changed from the first device to the second device.

19. The service providing method according to claim 18,
wherein in the step of generating of the service utilization information,
the service utilization information for a certain period including a time when the subscribed device is changed from the first device to the second device is generated, based on the first status of use of the first device for a period from a beginning of the certain period to the time with reference to the first usage information stored in the storage unit, and the second status of use of the second device for a period from the time to an end of the certain period with reference to the second usage information stored in the storage unit.

20. The service providing method according to claim 15, further comprising the step of:
determining whether a change-allowed condition for the changing is met, in response to the exchange request being acquired in the acquiring of the exchange request; and
changing the subscribed device in response to being determined in the determining that the change-allowed condition is met.

* * * * *